(12) United States Patent
Wang et al.

(10) Patent No.: US 12,033,374 B2
(45) Date of Patent: Jul. 9, 2024

(54) IMAGE PROCESSING METHOD, APPARATUS, AND DEVICE, AND STORAGE MEDIUM

(71) Applicant: TENCENT TECHNOLOGY (SHENZHEN) COMPANY LIMITED, Guangdong (CN)

(72) Inventors: Hao Wang, Guangdong (CN); Zhi Feng Li, Guangdong (CN); Wei Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 338 days.

(21) Appl. No.: 17/675,352

(22) Filed: Feb. 18, 2022

(65) Prior Publication Data

US 2022/0172462 A1 Jun. 2, 2022

Related U.S. Application Data

(63) Continuation of application No. PCT/CN2020/127435, filed on Nov. 9, 2020.

(30) Foreign Application Priority Data

Feb. 13, 2020 (CN) .......................... 202010090066.X (51) Int. Cl.
*G06V 10/774* (2022.01)
*G06N 3/045* (2023.01)
(Continued)

(52) U.S. Cl.
CPC ......... *G06V 10/7747* (2022.01); *G06N 3/045* (2023.01); *G06T 11/00* (2013.01);
(Continued)

(58) Field of Classification Search
CPC ............. G06V 10/7747; G06V 10/761; G06V 10/7715; G06V 10/776; G06V 10/806;
(Continued)

(56) References Cited

U.S. PATENT DOCUMENTS 10,496,809 B1 * 12/2019 Pham ..................... G06N 20/00
10,614,207 B1 * 4/2020 Truong .................. G06N 3/088
(Continued)

FOREIGN PATENT DOCUMENTS

CA 2734613 A1 * 2/2010 ......... G05D 23/1905
CN 108537238 A * 9/2018
(Continued)

OTHER PUBLICATIONS

Gao, Hongtao, (WO 2021102655 A1), Network Model Training Method, Image Property Recognition Method and Apparatus, and Electronic Device, Date filed Nov. 25, 2019, (Pub. Year: 2021), All pages.*
(Continued)

*Primary Examiner* — Mahendra R Patel
(74) *Attorney, Agent, or Firm* — Sughrue Mion, PLLC (57) ABSTRACT

An image processing method is provided. The image processing method includes: acquiring first second input images; extracting a content feature of the first input image; extracting an attribute feature of the second input image; performing feature fusion and mapping processing on the content feature of the first input image and the attribute feature of the second input image by using a feature transformation network to obtain a target image feature, the target image feature having the content feature of the first input image and the attribute feature of the second input image; and generating an output image based on the target image feature.

18 Claims, 4 Drawing Sheets

(51) Int. Cl.
 *G06T 11/00* (2006.01)
 *G06V 10/74* (2022.01)
 *G06V 10/77* (2022.01)
 *G06V 10/776* (2022.01)
 *G06V 10/80* (2022.01)
 *G06V 10/82* (2022.01)

(52) U.S. Cl.
 CPC ........ *G06V 10/761* (2022.01); *G06V 10/7715* (2022.01); *G06V 10/776* (2022.01); *G06V 10/806* (2022.01); *G06V 10/82* (2022.01)

(58) Field of Classification Search
 CPC ...... G06V 10/82; G06V 10/462; G06N 3/045; G06N 3/047; G06N 3/088; G06N 3/08; G06T 11/00; G06F 18/213
 USPC ........................................................ 382/157
 See application file for complete search history.

(56) References Cited

U.S. PATENT DOCUMENTS

| | | | | |
|---|---|---|---|---|
| 10,657,676 | B1* | 5/2020 | Rehfeld | G06N 3/084 |
| 2018/0357800 | A1* | 12/2018 | Oxholm | G06T 11/001 |
| 2019/0049540 | A1* | 2/2019 | Odry | G01R 33/543 |
| 2020/0126584 | A1* | 4/2020 | Huang | G10L 15/02 |
| 2020/0311986 | A1* | 10/2020 | Tong | B60R 11/04 |

FOREIGN PATENT DOCUMENTS

| | | | | | |
|---|---|---|---|---|---|
| CN | 109559363 | A | | 4/2019 | |
| CN | 109598671 | A | | 4/2019 | |
| CN | 109858482 | A | | 6/2019 | |
| CN | 109859096 | A | | 6/2019 | |
| CN | 110097606 | A | | 8/2019 | |
| CN | 110097606 | A | * 8/2019 | ......... G06K 9/00268 |
| CN | 110427813 | A | | 11/2019 | |
| CN | 111145131 | A | * 5/2020 | ........... G06K 9/4676 |
| CN | 111145311 | A | * 5/2020 | ......... G06K 9/00268 |
| CN | 111275057 | A | | 6/2020 | |
| CN | 112233170 | A | * 1/2021 | |
| CN | 108765261 | B | * 7/2022 | ........... G06T 3/0012 |
| WO | WO-2020155614 | A1 | * 8/2020 | |
| WO | WO-2021102655 | A1 | * 6/2021 | |

OTHER PUBLICATIONS

Dong, Xiaoy (WO 2020155614 A1), Image Processing Method and Device, Date filed Aug. 26, 2019, (Pub. Year: 2020, All pages.).*
Chen, Dong, (CN 110097606 A), Face Synthesis, Date filed Jan. 29, 2018. (Pub. Year: 2019), All pages.*
Translation of Written Opinion of the International Searching Authority dated Feb. 9, 2021 in International Application No. PCT/CN2020/127435.
Written Opinion for PCT/CN2020/127435, dated Feb. 9, 2021.
International Search Report for PCT/CN2020/127435, dated Feb. 9, 2021.

* cited by examiner

S401
Pre-train a to-be-trained content encoder network, a to-be-trained attribute encoder network, a to-be-trained feature transformation network, and a to-be-trained decoder network based on an image reconstruction loss function, to obtain parameters of a pre-trained content encoder network, parameters of a pre-trained attribute encoder network, and parameters of a pre-trained decoder network S402
Perform joint training on the pre-trained feature transformation network based on the parameters of the pre-trained content encoder network, the parameters of the pre-trained attribute encoder network, the parameters of the pre-trained decoder network, and a joint loss function

IMAGE PROCESSING METHOD, APPARATUS, AND DEVICE, AND STORAGE MEDIUM

CROSS-REFERENCE TO RELATED APPLICATIONS

This application is a bypass continuation application of International Application No. PCT/CN2020/127435, filed on Nov. 9, 2020, which claims priority to Chinese Patent Application No. 202010090066.X, filed with the China National Intellectual Property Administration on Feb. 13, 2020, the disclosures of which are herein incorporated by reference in their entireties.

FIELD

The present disclosure relates to image processing technologies, and more specifically, to an image processing method, apparatus, and device, and a storage medium.

BACKGROUND

Face image synthesis has many applications in the real world, such as face super-resolution, front side representation, and face image editing. Face image synthesis may be used in various fields, including image video processing and generation, and has a very important industrial value.

SUMMARY

One or more embodiments provide an image processing method, performed by at least one processor of an image processing device and including: acquiring a first input image and a second input image; extracting a content feature of the first input image; extracting an attribute feature of the second input image; performing feature fusion and mapping processing on the content feature of the first input image and the attribute feature of the second input image by using a feature transformation network to obtain a target image feature, the target image feature having the content feature of the first input image and the attribute feature of the second input image; and generating an output image based on the target image feature.

The extracting the content feature of the first input image may include: extracting the content feature of the first input image by using a content encoder network. The extracting the attribute feature of the second input image may include: extracting the attribute feature of the second input image by using an attribute encoder network. The generating the output image based on the target image feature may include: generating the output image based on the target image feature by using a decoder network.

The content encoder network and the attribute encoder network may be convolutional neural networks, the decoder network may be a deconvolutional neural network, and the feature transformation network may be a multi-layer perceptron formed by a plurality of fully connected layers.

The image processing method may further include: training a to-be-trained content encoder network, a to-be-trained attribute encoder network, a to-be-trained feature transformation network, and a to-be-trained decoder network based on an image reconstruction loss function, to obtain parameters of a trained content encoder network, parameters of a trained attribute encoder network, and parameters of a trained decoder network; and performing joint training on the feature transformation network based on the parameters of the trained content encoder network, the parameters of the trained attribute encoder network, the parameters of the trained decoder network, and a joint loss function.

The image reconstruction loss function may be an L2 distance or an L1 distance between a training input image of the to-be-trained attribute encoder network and a training output image of the to-be-trained decoder network.

The joint loss function may include at least two from among the image reconstruction loss function, a content loss function, and a generative adversarial loss function.

The content loss function may be an L2 distance, L1 distance or cosine similarity between a content feature of a training input image of the to-be-trained content encoder network and a content feature of a training output image of the to-be-trained decoder network.

A content recognition network may be used for extracting the content feature of the training input image of the to-be-trained content encoder network and the content feature of the training output image of the to-be-trained decoder network.

The generative adversarial loss function may be an L2 distance or an L1 distance between an attribute feature of a training input image of the to-be-trained attribute encoder network and an attribute feature of a training output image of the to-be-trained decoder network.

The image processing method may further include extracting the attribute feature of the training input image of the to-be-trained attribute encoder network and the attribute feature of the training output image of the to-be-trained decoder network by using a discrimination network.

One or more embodiments provide an image processing device, including: at least one memory configured to store program code; and at least one processor configured to read the program code and operate as instructed by the program code to implement the foregoing method.

One or more embodiments provide a non-transitory computer readable storage medium, storing computer executable instructions, which when executed by a processor, cause the processor to implement the foregoing method.

BRIEF DESCRIPTION OF THE DRAWINGS

The above and other aspects will be more apparent from the following description of embodiments taken in conjunction with the accompanying drawings, in which.

DETAILED DESCRIPTION

Embodiments will now be described more fully with reference to the drawings. The described embodiments are only some of embodiments consistent with the present disclosure. It will be understood that this disclosure is not limited to the embodiments described herein.

In the specification and the drawings, operations and elements that are substantially the same or similar are denoted by the same or similar reference numerals, and repeated descriptions of these operations and elements are omitted. In the descriptions, terms "first" and "second" are only used to describe the objective and cannot be understood as indicating or implying relative importance or an order.

Embodiments relate to technologies such as artificial intelligence, machine learning, etc. The following introduces concepts related to this application.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that may respond in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

Machine learning (ML) is a multi-field interdisciplinary subject involving the probability theory, statistics, the approximation theory, convex analysis, the algorithm complexity theory, and the like, ML specializes in studying how a computer simulates or implements a human learning behavior to obtain new knowledge or skills, and reorganize an existing knowledge structure to keep improving its performance. ML is a core of the AI, is a basic way to make the computer intelligent, and is applied to various fields of the AI. ML and DL usually include technologies such as artificial neural network, belief network, reinforcement learning, transfer learning, and inductive learning.

In a practical application scenario, it is a relatively challenging task to synthesize a face image of a specific scenario under a condition that an identity remains unchanged. If an identity feature of an identity face image and an attribute feature of an attribute face image are simply combined and concatenated, identity information of the identity face image and attribute information of the attribute face image cannot be fully represented in the generated face image, and all network parameters are jointly constrained by an identity and an attribute in a training process, which may cause an unreal synthesis defect in an encoding and decoding process of the image. Therefore, there is a need for an image synthesis method that involves efficient and quick training, has a wide applicability, and generates a face image that is more similar to an expected attribute while face identity information is maintained.

Therefore, embodiments provide an image processing method, which introduces a feature transformation network and performs staged training on an entire image processing system, so that the image processing system is trained efficiently and quickly, has a wide applicability, and generates an output image that is more similar to an expected attribute while content information is maintained.

The following describes embodiments with reference to the accompanying drawings.

Figure 1:
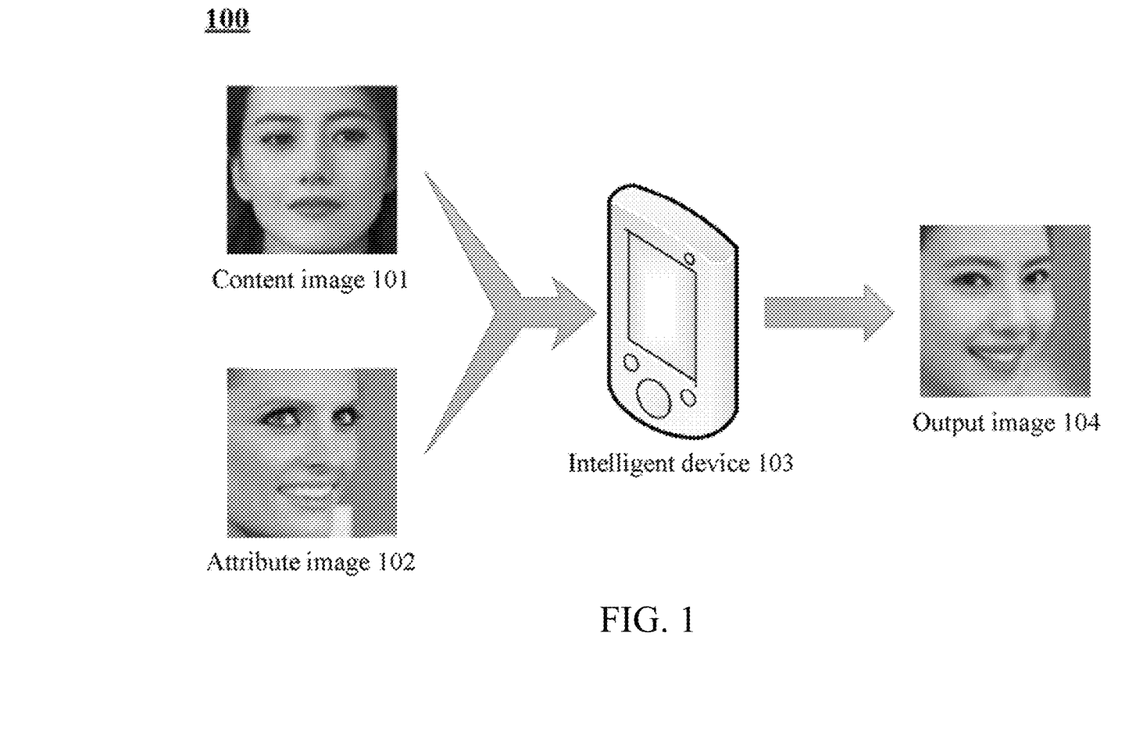
FIG. 1 is a schematic diagram of an application scenario of an image processing device according to an embodiment.

FIG. 1 is a schematic diagram of an application scenario 100 of an image processing device according to an embodiment.

As shown in FIG. 1, in the scenario 100, a user expects to perform image synthesis on a content image 101 and an attribute image 102. The user inputs a first input image 101 (or referred to as the content image 101) and a second input image 102 (or referred to the attribute image 102) into an intelligent device 103, and finally outputs an output image 104 having a content feature (for example, an identity feature) of the content image 101 and an attribute feature (for example, a posture, illumination, hairstyle, background, and style) of the attribute image 102 through synthesis conversion processing by the intelligent device.

The intelligent device 103 may be any type of intelligent device that has an image processing function, such as a smartphone, a smart TV, a tablet computer, a game console, an electronic computer, or may be a software or a hardware module that forms a part of these intelligent devices. The intelligent device 103 may have a built-in or external camera configured to acquire the inputted content image 101 and attribute image 102. The intelligent device 103 may have a built-in or external display interface or another type of output interface configured to output the output image 104 after image synthesis processing. The intelligent device 103 may further have a remotely or locally connected memory configured to store the inputted content image 101 and attribute image 102, the output image 104, and any data or instructions required for system operation. The intelligent device 103 may provide a graphical user interface (GUI) through the display interface or output interface, and may manipulate the GUI based on inputs received through an input interface. For example, the user may select the content image 101 and attribute image 102 through the GUI.

The content image 101 may be any image having a content feature, for example, may be a face image having specific identity information, or may be a cartoon figure image or an animal face image. Similarly, the attribute image 102 may be an image having any attribute feature, for example, may be an image having a smile face feature, may be an image having a bright image background, may be an image having a crown or a spectacle ornament, or may be an image having a specific style such as a sketch style, or the like.

The content image 101 and the attribute image 102 may be acquired in real time by using a camera built-in or external to the intelligent device 103, or may be acquired in real time by using various communications networks such as a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or another mobile communications network, a Bluetooth, a near-field communication (NFC), and ultrasonic communications. In another embodiment, the content image 101 and the attribute image 102 may also be specific images stored in a memory accessible to the intelligent device 103. For example, the content image 101 and the attribute image 102 may be pre-stored in the memory.

Next, an example image processing method according to an embodiment is described with reference to FIG. 2 and FIG. 3.

Figure 2:
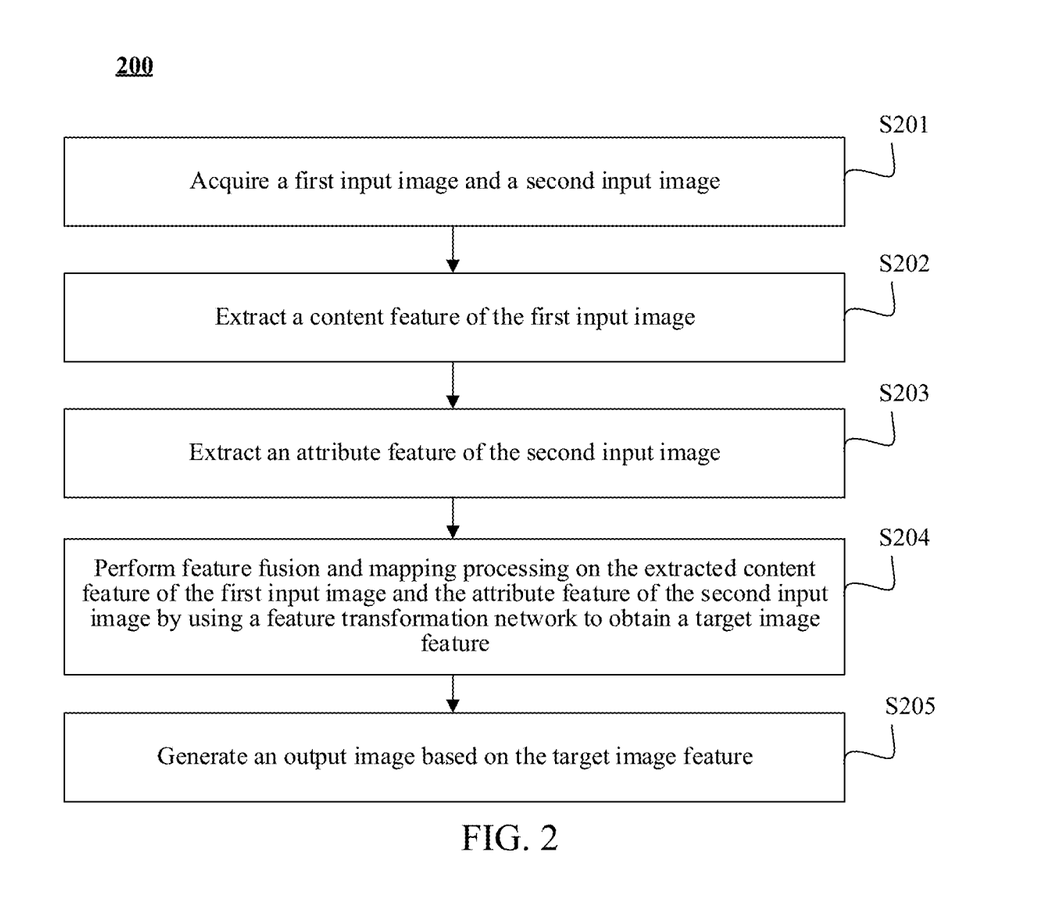
FIG. 2 is a flowchart of an image processing method according to an embodiment.

FIG. 2 is a flowchart of an image processing method 200 according to an embodiment. FIG. 3 is a schematic structural diagram of an image processing system 300 according to an embodiment.

Figure 3:
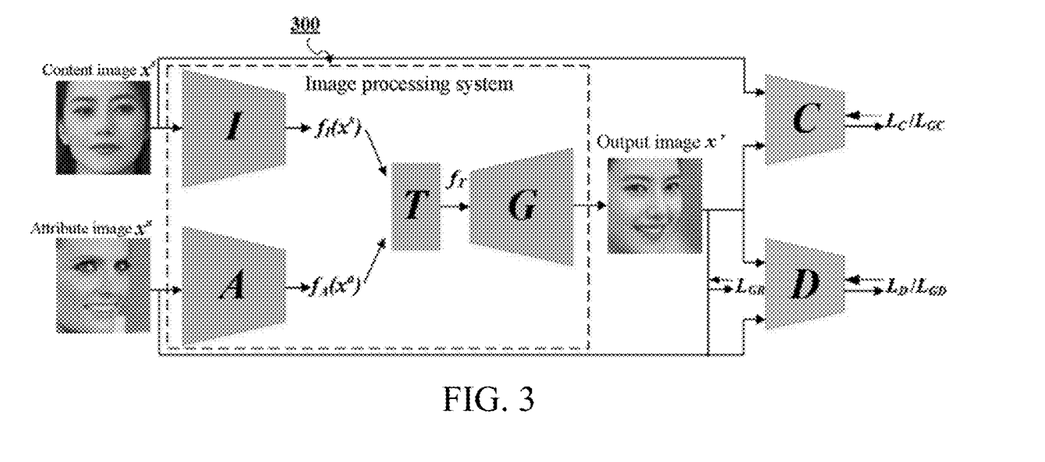
FIG. 3 is a schematic structural diagram of an image processing system according to an embodiment.

As shown in FIG. 3, the image processing system 300 may include a content encoder network I, an attribute encoder network A, a feature transformation network T, and a decoder network G, as shown by a dashed line box in FIG. 3. The content encoder network I, the attribute encoder network A, the feature transformation network T, and the decoder network G may be trained by using a specific neural network training algorithm. The feature transformation network T may be a latent vector transformation network.

The image processing method in this embodiment is performed by an image processing device. In FIG. 2, first, in operation S201, a first input image and a second input image may be acquired.

For example, as shown in FIG. 3, the first input image may be a content image $x^s$, and the second input image may be an attribute image $x^a$. It is to be understood that the terms "first" and "second" used herein are used only for distinguishing between descriptions, and are not used for indicating or implying relative importance or sorting. As described above, the first input image and the second input image may be acquired in real time by using a camera of the intelligent device 103, may be acquired in real time by using various networks, may be acquired from a memory accessible to the intelligent device 103, or may be acquired in any other image acquiring manner.

In operation S202, a content feature of the first input image may be extracted.

In an embodiment, the content feature of the first input image may be extracted by using a trained content encoder network. For example, as shown in FIG. 3, a content feature vector $fI(x^s)$ in a specific dimension (for example, 1×512) of the content image $x^s$ may be extracted by using the trained content encoder network I. The content feature vector $fI(x^s)$ may include specific content feature information of the content image $x^s$, for example, may represent identity information of the content image $x^s$. In an embodiment, the content encoder network I may be a convolutional neural network. In another embodiment, the content encoder network I may be any other type of neural network. A training process of the content encoder network I is described in detail below.

In operation S203, an attribute feature of the second input image may be extracted.

In an embodiment, the attribute feature of the second input image may be extracted by using a trained attribute encoder network. For example, as shown in FIG. 3, an attribute feature vector $fA(x^a)$ in a specific dimension (for example, 1×512) of the attribute image $x^a$ may be extracted by using the trained attribute encoder network A. The attribute feature vector $fA(x^a)$ may include specific attribute feature information of the attribute image $x^a$, for example, may represent information such as a posture, illumination, hair, background, or style of the attribute image $x^a$. In an embodiment, the attribute encoder network A may be a convolutional neural network. In another embodiment, the attribute encoder network A may be any other type of neural network. A training process of the attribute encoder network A is described in detail below.

In operation S204, feature fusion and mapping processing may be performed on the extracted content feature of the first input image and the attribute feature of the second input image by using a feature transformation network to obtain a target image feature, the target image feature having the content feature of the first input image and the attribute feature of the second input image.

In an embodiment, a trained feature transformation network may be used for performing feature mapping on the extracted content feature of the first input image and the attribute feature of the second input image to obtain the target image feature. For example, as shown in FIG. 3, the trained feature transformation network T may be used for performing feature mapping on the extracted content feature vector $fI(x^s)$ of the first input image $x^s$ and the attribute feature vector $fA(x^a)$ of the second input image $x^a$, to obtain a target image feature vector $f_T$. Any image feature fusion algorithm may be used for performing feature fusion and mapping processing on the content feature vector $fI(x^s)$ and the attribute feature vector $fA(x^a)$. It is to be understood that, according to the feature fusion and mapping processing in this embodiment, different from performing simple feature splicing on the content feature vector $fI(x^s)$ and the attribute feature vector $fA(x^a)$, according to the feature fusion and mapping in this embodiment, the content feature of the first input image $x^s$ and the attribute feature of the second input image $x^a$ may be fully understood, and the target image feature may be fully expressed. In an embodiment, the feature transformation network T may be implemented by using a multi-layer perceptron including a plurality of fully connected layers. Parameters of the feature transformation network T may be trained based on a plurality of training samples, so that the target image feature vector $f_T$ obtained through feature fusion and mapping processing performed by the feature transformation network T may have content feature information of the first input image and attribute feature information of the second input image. In the following, a training process of the feature transformation network T is further described in detail. In another embodiment, the feature transformation network T may be any other type of neural network.

Finally, in operation S205, an output image may be generated based on the target image feature.

In an embodiment, a trained decoder network may be used for generating the output image based on the target image feature. For example, as shown in FIG. 3, an output image x' may be generated based on the target image feature vector $f_T$ by using the trained decoder network G. In an embodiment, the decoder network G may be a deconvolutional neural network in correspondence with the content encoder network I and the attribute encoder network A. In another embodiment, the decoder network G may be any other type of neural network. A training process of the decoder network G is described in detail below.

An embodiment provides an image processing method, which introduces a feature transformation network and performs staged training on an entire image processing system, so that the image processing system is trained efficiently and quickly, has a wide applicability, and generates an output image that is more similar to an expected attribute while content information is maintained.

Figure 4:
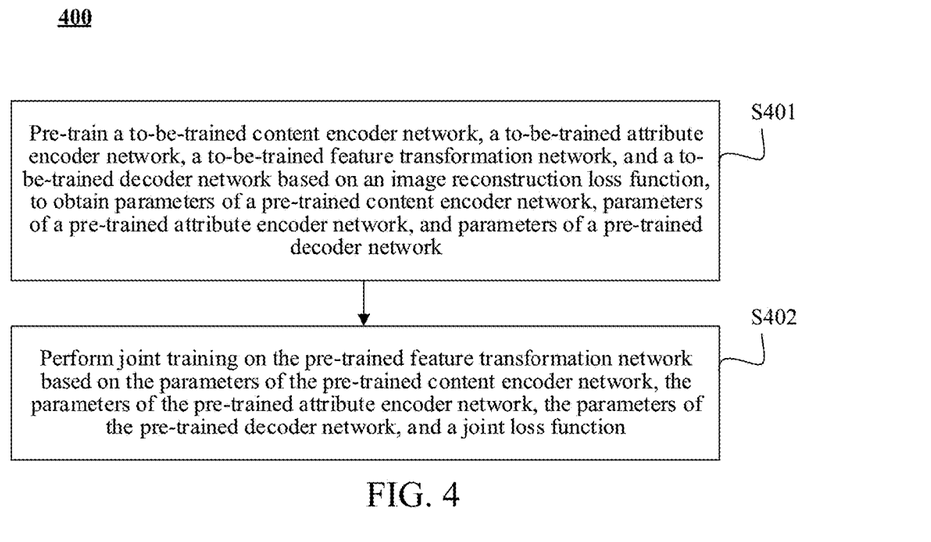
FIG. 4 is a flowchart of a training method of an image processing system according to an embodiment.

The following provides an example description of the training process of the content encoder network I, the attribute encoder network A, the feature transformation network T, and the decoder network G shown in FIG. 3 with reference to FIG. 4.

FIG. 4 is a flowchart of an example training method 400 of an image processing system 300 according to an embodiment.

As shown in FIG. 4, a training process of the image processing system 300 may be performed in two stages.

In the first stage, that is, in operation S401, pre-train a to-be-trained content encoder network, a to-be-trained attribute encoder network, a to-be-trained feature transformation network, and a to-be-trained decoder network may be trained based on an image reconstruction loss function, to obtain parameters of a pre-trained content encoder network, parameters of a pre-trained attribute encoder network, and parameters of a pre-trained decoder network. According to some embodiments, the content encoder network, the attribute encoder network, the feature transformation network, and the decoder network are not pre-trained.

In the following, I0, A0, T0, and G0 are respectively used for representing the to-be-trained content encoder network, the to-be-trained attribute encoder network, the to-be-trained feature transformation network, and the to-be-trained decoder network, and S0 is used for representing the to-be-trained image processing system 300.

Specifically, in a pre-training phase (that is, the first phase), parameters of the to-be-trained content encoder network I0, the to-be-trained attribute encoder network A0, the to-be-trained feature transformation network T0, and the to-be-trained decoder network G0 may be pre-trained by using a first content image sample set S1 including a plurality of content image samples and a first attribute image sample set S2 including a plurality of attribute image samples. For example, in each training iteration, a content image sample Xs may be selected from the first content image sample set S1 and an attribute image sample $X^a$ may be selected from the first attribute image sample set S2, and respectively inputted into the to-be-trained content encoder network I0 and the to-be-trained attribute encoder network A0, and then a training output image X' is generated through feature transformation of T0 and decoding processing of G0.

In an embodiment, an image reconstruction loss function may be used for constraining a pre-training process of the to-be-trained image processing system S0. Specifically, the image reconstruction loss function may be a Euclidean distance between a training input image (that is, an attribute image sample) of the to-be-trained attribute encoder network A0 and a training output image of the to-be-trained decoder network G0. The Euclidean distance is also referred to as an L2 distance or a Manhattan distance, also referred to as an L1 distance. For example, when the form of the L2 distance is used, the image reconstruction loss function $L_{GR}$ may be defined as follows:

$$L_{GR}=½\|X^a-X'\|_2^2 \quad (1)$$

$X^a$ is the training input image of the to-be-trained attribute encoder network A0, and X' is the training output image of the to-be-trained decoder network G0.

The to-be-trained image processing system S0 is pre-trained by minimizing the image reconstruction loss function $L_{GR}$, so that an image generated by the trained image processing system 300 is as close as possible to an attribute image at a lower pixel level, and has attribute information such as a contour edge, a background, and illumination that are consistent with that of the image processing system 300.

Next, in the second stage, that is, in operation S402, joint training may be performed on the pre-trained feature transformation network based on the parameters of the pre-trained content encoder network, the parameters of the pre-trained attribute encoder network, the parameters of the pre-trained decoder network, and a joint loss function.

In a joint training phase (for example, the second phase), parameters of the pre-trained content encoder network I0, attribute encoder network A0, and decoder network G0 may be first fixed, and then joint training is performed on the to-be-trained feature transformation network T0 based on a joint loss function by using a second content image sample set S3 including a plurality of content image samples and a second attribute image sample set S4 including a plurality of attribute image samples. The second content image sample set S3 may be the same as or different from the first content image sample set S1, and the second attribute image sample set S4 may be the same as or different from the first attribute image sample set S2. In an embodiment, the joint loss function may include at least two of a content loss function, a generative adversarial function, and the image reconstruction loss function as described above.

In an embodiment, as shown in FIG. 3, in a joint training phase, a content loss function LGC may be acquired by using a trained content recognition network C. The content recognition network C may be any type of content recognition network, for example, it may be any face recognition network model, such as the VGGFace model or the CosFace model. In an embodiment, the content recognition network C may be based on a large quantity of content image samples with reference recognition results and trained by using a cross-entropy loss function LC.

A content feature $f_C(Ys)$ of a training input image Ys and a content feature $f_C(Y')$ of a training output image Y' of the to-be-trained decoder network G0 of the to-be-trained content encoder network I0 (whose parameters are fixed in the joint training stage) may be separately extracted by using the trained content recognition network C, and the parameters of the to-be-trained feature transformation network T0 are adjusted in the joint training process, so that the L2 distance or the L1 distance therebetween is the minimum distance or cosine similarity is the maximum. For example, when the form of the L2 distance is used, the content loss function LGC may be defined as follows:

$$L_{GC}=½\|f_C(Y')-f_C(Y^s)\|_2^2 \quad (2)$$

The to-be-trained image processing system S0 is jointly trained by minimizing the content loss function LGC, so that the image generated by the trained image processing system 300 has a similar content feature (for example, an identity feature) to the content image at high level content semantics.

In an embodiment, as shown in FIG. 3, in the joint training phase, a to-be-trained discrimination network D may be used for forming a generative adversarial network (GAN) with the to-be-trained image processing system S0 and performing joint adversarial training. For example, in each alternate iterative training, an output image sample set S5 including a plurality of output images pre-generated by the to-be-trained image processing system S0 or the trained image processing system S0 (where each output image sample is marked with a sample 0 to indicate that it is a "false" image) and a third attribute image sample set S6 including a plurality of attribute image samples (where each attribute image sample is marked with a sample 1 to indicate that it is a "true" image) may be used for training the to-be-trained discrimination network D. For example, all parameters of the to-be-trained image processing system S0 may be first fixed, and only parameters of the discrimination network D may be updated, so that the "true" image and the "false" image may be correctly distinguished as far as possible. In this operation, the loss function described below may be used as a loss function for training the to-be-trained discrimination network D:

$$L_D=-E_{z^a \sim P_{z^a}}[\log D(z^a)]-E_{z' \sim P_{z'}}[\log D(z')] \quad (3)$$

$D(z^a)$ is a discrimination output of the discrimination network D for a "true" image sample $z^a$, $D(z')$ indicates a discrimination output of the discrimination network D for a "false" image sample z', $z^a$~$P_{z^a}$ indicates that $z^a$ obeys probability distribution $P_{z^a}$, $E_{z^a \sim P_{z^a}}$ [ ] indicates an expectation on the probability distribution $P_{z^a}$, z'~$P_{z'}$, indicates that z' obeys probability distribution $P_{z'}$, and $E_{z' \sim P_{z'}}$[ ] indicates an expectation on the probability distribution $P_{z'}$.

After the parameters of the to-be-trained discrimination network D are updated, the parameters of the to-be-trained discrimination network D may be fixed on this basis, and only the parameters of the to-be-trained image processing system S0 are updated, so that the "true" image and the "false" image cannot be correctly distinguished as far as possible. In the foregoing embodiment, because the parameters of the content encoder network I0, the attribute encoder network A0, and the decoder network G0 are fixed after the training phase, in this operation, only the parameters of the to-be-trained feature transformation network T0 may be updated. Therefore, the two operations are alternately iterated, so as to implement adversarial training between the to-be-trained image processing system S0 and the to-be-trained discrimination network D. The to-be-trained image processing system S0 may be trained by using any feasible GAN training loss function. For example, in an embodiment, an attribute feature fD(ka) of a training input image $k^a$ of the to-be-trained attribute encoder A0 and an attribute feature fD(k') of a training output image k' of the to-be-trained decoder network G0 may be extracted by using the discrimination network D, and then the L2 distance or the L1 distance therebetween is used as a generative adversarial loss function for training the image processing system S0. For example, when the form of the L2 distance is used, the generative adversarial loss function LGD may be defined as follows:

$$L_{GD} = \frac{1}{2} \|f_D(k') - f_D(k^a)\|_2^2 \quad (4)$$

where $f_D(k)$ may indicate an intermediate layer feature of the discrimination network D. For example, when the discrimination network D includes one or more fully connected layers, $f_D(k)$ may be an input to the last fully connected layer of the discrimination network D.

In addition to the foregoing defined function forms, the generative adversarial loss function LGD may be another type of generative adversarial loss function and policy that are proven valid, for example, LSGAN and PatchGAN.

Therefore, in an embodiment, in the second training phase, the to-be-trained feature transformation network T0 may be jointly trained by using a joint loss function including the image reconstruction loss function $L_{GR}$, the content loss function LGC, and the generative adversarial loss function LGD. That is, the joint loss function L may be defined as follows:

$$L = L_{GR} + \lambda_{GC} L_{GC} + \lambda_{GD} L_{GD} \quad (5)$$

where $\lambda_{GC}$ and $\lambda_{GD}$ are hyper-parameters used for balancing corresponding loss items.

After the two stages of training shown in FIG. 4, the system enables the generated output image to have the same background texture, contour edge, and other details as much as possible with the inputted attribute image in the first stage, and enables the generated output image to retain content information (for example, identity information) similar to that of the inputted content image in the second stage.

Figure 5:
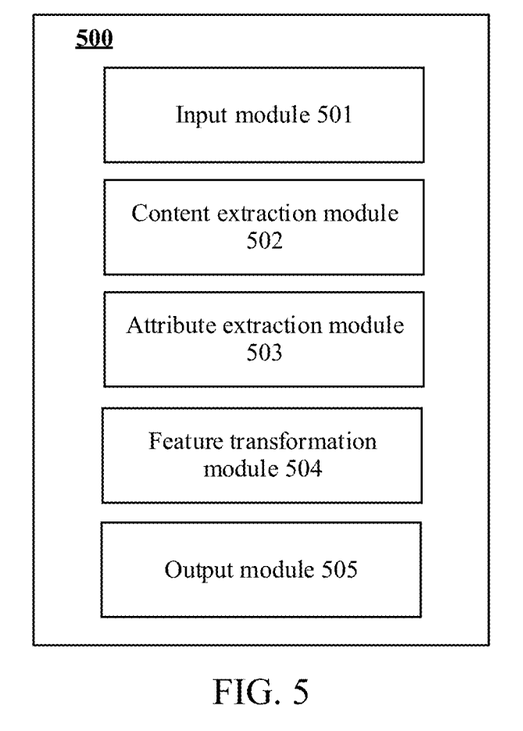
FIG. 5 is a schematic diagram of an image processing apparatus according to an embodiment.

FIG. 5 is a schematic diagram of an image processing apparatus 500 according to an embodiment.

As shown in FIG. 5, the image processing apparatus 500 according to this embodiment may include an input module 501, a content extraction module 502, an attribute extraction module 503, a feature transformation module 504, and an output module 505. The input module 501 may be configured to acquire a first input image and a second input image. The content extraction module 502 may be configured to extract a content feature of the first input image. The attribute extraction module 503 may be configured to extract an attribute feature of the second input image. The feature transformation module 504 may be configured to perform feature fusion and mapping processing on the extracted content feature of the first input image and the extracted attribute feature of the second input image by using a feature transformation network to obtain a target image feature, the target image feature having the content feature of the first input image and the attribute feature of the second input image. The output module 505 may be configured to generate an output image based on the target image feature.

Figure 6:
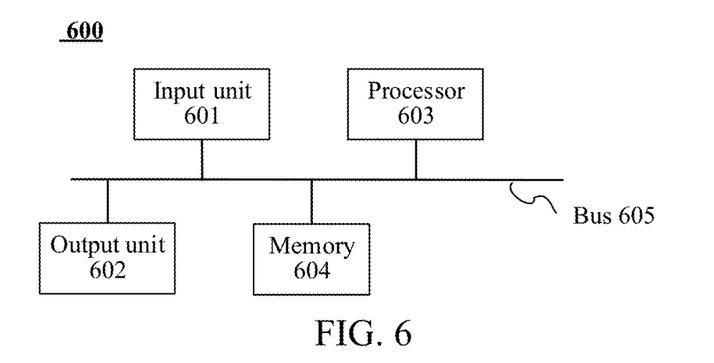
FIG. 6 is a schematic diagram of an image processing device according to an embodiment.

FIG. 6 is a schematic diagram of an image processing device 600 according to an embodiment.

As shown in FIG. 6, the image processing device 600 according to this embodiment may include an input unit 601, an output unit 602, a processor 603, and a memory 604. They may be interconnected by using a bus 605.

The input unit 601 may be any image input unit that may receive an input image in various forms, such as an image collection unit or a network input unit, and may be configured to acquire an input image.

The output unit 602 may be any type of display interface that may display an output image or another type of output interface that may output an output image in another manner.

The processor 603 may perform various actions and processing according to a program or a code that are stored in the memory 604. Specifically, the processor 603 may be an integrated circuit chip, having a capability of processing a signal. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform disclosed methods, operations, flows, logical block diagrams and modules. The general-purpose processor may be a microprocessor, or the processor may be any conventional processor, or the X86 architecture or ARM architecture and the like.

The memory 604 stores executable instruction code, and the instruction code is used for implementing image processing methods according to embodiments when being executed by the processor 603. For example, the memory 604 0 may be a non-transitory storage medium. The memory 604 may be a volatile memory or a non-volatile memory, or may include a volatile memory and a non-volatile memory. The non-volatile memory may be a read-only memory (ROM), a programmable ROM (PROM), an erasable programmable ROM (EPROM), an electrically erasable programmable ROM (EEPROM), or a flash memory. The volatile memory may be a random access memory (RAM), used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory described herein may include, but is not limited to, these memories, and may include any other suitable types of memories.

This application further provides a computer readable storage medium, storing computer executable instructions, the computer instructions, when executed by a processor, implementing the image processing method according to embodiments. Similarly, the computer readable storage medium in embodiments may be a volatile memory or a non-volatile memory, or may include both a volatile memory and a non-volatile memory. It should be noted that, the memory described herein may include, but is not limited to, these memories, and may include any other suitable types of memories.

Embodiments provide an image processing method, apparatus, and device, which introduce a feature transformation network and perform staged training on an entire image processing system, so that the image processing system is trained efficiently and quickly, has a wide applicability, and generates an output image that is more similar to an expected attribute while content information is maintained.

The flowcharts and block diagrams in the accompanying drawings illustrate possible system architectures, functions, and operations that may be implemented by a system, a method, and a computer program product according to various embodiments. In this regard, each box in a flowchart or a block diagram may represent a module, a program segment, or a part of code. The module, the program segment, or the part of code includes at least one executable instructions used for implementing designated logic functions. In some implementations used as substitutes, functions annotated in boxes may alternatively occur in a sequence different from that annotated in an accompanying drawing. For example, two boxes shown in succession may be performed in parallel, and sometimes the two boxes may be performed in a reverse sequence. This is determined by a related function. It should also be noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

In general, various embodiments may be implemented in hardware or a dedicated circuit, software, firmware, logic, or any combination thereof. Some aspects may be implemented in hardware, while other aspects may be implemented in firmware or software executable by a controller, a microprocessor, or other computing devices. When various aspects are illustrated or described as block diagrams, flowcharts, or represented by some other graphs, it should be understood that the blocks, apparatuses, systems, technologies, or methods described herein may be implemented, as non-restrictive examples, in hardware, software, firmware, a dedicated circuit or logic, general-purpose hardware or a controller or other computing devices, or some combinations thereof.

While aspects of example embodiments have been particularly shown and described, it will be understood by one of ordinary skill in the art that variations in form and detail may be made therein without departing from the spirit and scope of the attached claims.

What is claimed is:

1. An image processing method, performed by at least one processor of an image processing device and comprising:
   acquiring a first input image and a second input image;
   extracting a content feature of the first input image by using a content encoder network;
   extracting an attribute feature of the second input image by using an attribute encoder network;
   performing feature fusion and mapping processing on the content feature of the first input image and the attribute feature of the second input image by using a feature transformation network to obtain a target image feature, the target image feature having the content feature of the first input image and the attribute feature of the second input image; and
   generating an output image based on the target image feature by using a decoder network.

2. The image processing method according to claim 1, wherein the content encoder network and the attribute encoder network are convolutional neural networks, the decoder network is a deconvolutional neural network, and the feature transformation network is a multi-layer perceptron formed by a plurality of fully connected layers.

3. The image processing method according to claim 1, further comprising:
   training a to-be-trained content encoder network, a to-be-trained attribute encoder network, a to-be-trained feature transformation network, and a to-be-trained decoder network based on an image reconstruction loss function, to obtain parameters of a trained content encoder network, parameters of a trained attribute encoder network, and parameters of a trained decoder network; and
   performing joint training on the feature transformation network based on the parameters of the trained content encoder network, the parameters of the trained attribute encoder network, the parameters of the trained decoder network, and a joint loss function.

4. The image processing method according to claim 3, wherein the image reconstruction loss function is an L2 distance or an L1 distance between a training input image of the to-be-trained attribute encoder network and a training output image of the to-be-trained decoder network.

5. The image processing method according to claim 3, wherein the joint loss function comprises at least two from among the image reconstruction loss function, a content loss function, and a generative adversarial loss function.

6. The image processing method according to claim 5, wherein the content loss function is an L2 distance, L1 distance or cosine similarity between a content feature of a training input image of the to-be-trained content encoder network and a content feature of a training output image of the to-be-trained decoder network.

7. The image processing method according to claim 6, wherein a content recognition network is used for extracting the content feature of the training input image of the to-be-trained content encoder network and the content feature of the training output image of the to-be-trained decoder network.

8. The image processing method according to claim 5, wherein the generative adversarial loss function is an L2 distance or an L1 distance between an attribute feature of a training input image of the to-be-trained attribute encoder network and an attribute feature of a training output image of the to-be-trained decoder network.

9. The image processing method according to claim 8, further comprising extracting the attribute feature of the training input image of the to-be-trained attribute encoder network and the attribute feature of the training output image of the to-be-trained decoder network by using a discrimination network.

10. An image processing apparatus, comprising:
at least one memory configured to store program code; and
at least one processor configured to read the program code and operate as instructed by the program code, the program code comprising:
  acquisition code configured to cause at least one of the at least one processor to acquire a first input image and a second input image;
  content extraction code configured to cause at least one of the at least one processor to extract a content feature of the first input image by using a content encoder network;
  attribute extraction code configured to cause at least one of the at least one processor to extract an attribute feature of the second input image by using an attribute encoder network;
  feature transformation code configured to cause at least one of the at least one processor to perform feature fusion and mapping processing on the content feature of the first input image and the attribute feature of the second input image by using a feature transformation network to obtain a target image feature, the target image feature having the content feature of the first input image and the attribute feature of the second input image; and
  output code configured to cause at least one of the at least one processor to generate an output image based on the target image feature by using a decoder network.

11. The image processing apparatus according to claim 10, wherein the content encoder network and the attribute encoder network are convolutional neural networks, the decoder network is a deconvolutional neural network, and the feature transformation network is a multi-layer perceptron formed by a plurality of fully connected layers.

12. The image processing apparatus according to claim 10, wherein the program code further comprises:
  training code configured to cause at least one of the at least one processor to train a to-be-trained content encoder network, a to-be-trained attribute encoder network, a to-be-trained feature transformation network, and a to-be-trained decoder network based on an image reconstruction loss function, to obtain parameters of a trained content encoder network, parameters of a trained attribute encoder network, and parameters of a trained decoder network; and
  joint training code configured to cause at least one of the at least one processor to perform joint training on the feature transformation network based on the parameters of the trained content encoder network, the parameters of the trained attribute encoder network, the parameters of the trained decoder network, and a joint loss function.

13. The image processing apparatus according to claim 12, wherein the image reconstruction loss function is an L2 distance or an L1 distance between a training input image of the to-be-trained attribute encoder network and a training output image of the to-be-trained decoder network.

14. The image processing apparatus according to claim 12, wherein the joint loss function comprises at least two from among the image reconstruction loss function, a content loss function, and a generative adversarial loss function.

15. The image processing apparatus according to claim 14, wherein the content loss function is an L2 distance, L1 distance or cosine similarity between a content feature of a training input image of the to-be-trained content encoder network and a content feature of a training output image of the to-be-trained decoder network.

16. The image processing apparatus according to claim 15, wherein a content recognition network is used for extracting the content feature of the training input image of the to-be-trained content encoder network and the content feature of the training output image of the to-be-trained decoder network.

17. The image processing apparatus according to claim 14, wherein the generative adversarial loss function is an L2 distance or an L1 distance between an attribute feature of a training input image of the to-be-trained attribute encoder network and an attribute feature of a training output image of the to-be-trained decoder network.

18. A non-transitory computer readable storage medium, storing a computer program, the computer program being executable by at least one processor to cause the at least one processor to perform an image processing method comprising:
  acquiring a first input image and a second input image;
  extracting a content feature of the first input image by using a content encoder network;
  extracting an attribute feature of the second input image by using an attribute encoder network;
  performing feature fusion and mapping processing on the content feature of the first input image and the attribute feature of the second input image by using a feature transformation network to obtain a target image feature, the target image feature having the content feature of the first input image and the attribute feature of the second input image; and
  generating an output image based on the target image feature by using a decoder network.

* * * * *